3,655,876
Patented Apr. 11, 1972

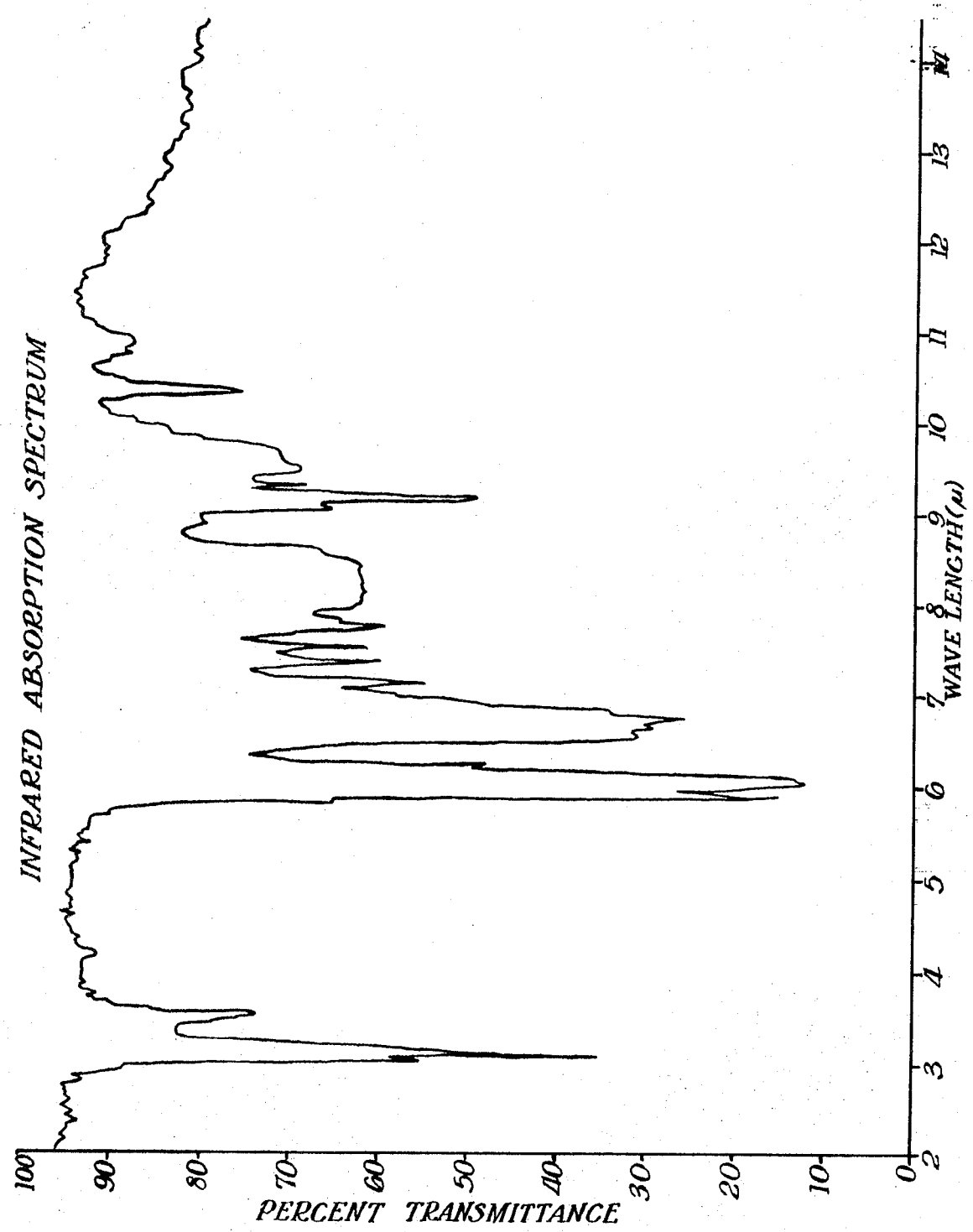

3,655,876
ANTIBIOTIC CP–21,635
Frank C. Sciavolino, Niantic, John B. Routien, Lyme, Edward J. Tynan, Gales Ferry, and Walter D. Celmer, New London, Conn., assignors to Pfizer Inc., New York, N.Y.
Filed Aug. 7, 1970, Ser. No. 61,920
Int. Cl. A61k 21/00
U.S. Cl. 424—117                  3 Claims

ABSTRACT OF THE DISCLOSURE

A new crystalline antibiotic, its production by fermentation, methods for its recovery and concentration and its purification are described.

SUMMARY OF THE INVENTION

Antibiotic CP–21,635 is formed during the cultivation, under controlled conditions, of a strain of a species of microorganism known as *Streptomyces olivaceus sensu* Hütter, which was identified by planting and testing a culture thereof on media normally used for the identification of such microorganisms. A culture of the microorganism has been deposited in the American Type Culture Collection, Rockville, Md., and added to its collection of microorganisms as ATCC 21542.

The cultural characteristics of the strain of *Streptomyces olivaceus sensu* Hütter are set forth in the following table. Colors of aerial mycelium are in accordance with Tresner and Backus's Color Wheel and Ridgway's Color Guide.

| Medium | Growth | Color of aerial mycelium | Color of vegetative mycelium | Soluble pigment | Remarks |
|---|---|---|---|---|---|
| Water agar | Poor, thin, flat | White | White | Lacking | |
| Synthetic agar plates | Moderate, flat, spreading | Gray (5 fe) or pale mouse gray of Ridgway | Colorless | Lacking | Chains of spores of RF type, mostly more than 50 spores; direct from agar or branches close to branches close to agar. |
| Glucose-asparagine agar plates | Good raised | Gray (near 5 fe) or pale mouse gray of Ridgway | Brownish-gray | Pale yellow | |
| Nutrient agar plates | Good, flat | Lacking | Very pale yellow | Lacking | |
| Glucose agar plates | do | Scant, white | Brown | Light brown | |
| Emerson's agar plates | Good, somewhat raised | Red (5 de) or pale mouse gray of Ridgway | do | Pale brown | |
| Pridham's yeast extract agar plates | Excellent, flat, spreading | Gray (3 fe) or pale mouse gray of Ridgway | Dark brown | Brown | Chains of spores as described on synthetic agar. Spores smooth by electron microscope. |
| Tomato paste oatmeal agar plates | do | do | do | do | Spores cylindrical squares ends, mostly 1.1 × 0.6μ Range of 0.6 × 0.6 to 1.6 × 0.7μ. |
| Tyrosine agar plates | Good, flat, thin | Scant, white | Brown-orange | do | Digestion of tyrosine crystals. |
| Calcium malate agar plates | Moderate, thin | Lacking | Light reddish-purple | Lacking | No digestion. |
| Casein agar plates | Good, flat | do | Cream-colored | Brown | Complete digestion. |
| Starch agar plates | do | Very pale gray | White | Lacking | 6 mm. zone of hydrolysis in 3 days; 10–15 mm. in 14 days. |
| Gelatin agar plates | do | Scant, white | Brownish salmon | Pale yellow-brown | 4 mm. zone of liquefaction in 3 days; 12 mm. in 14 days. |
| Potatoe plug | Moderate | Lacking | Pale brown | Gray | |

BACKGROUND OF THE INVENTION

This invention relates to a new and useful fermentation product called Antibiotic CP–21,635; to its production by fermentation, to methods for its recovery and concentration from crude solutions, such as fermentation broths, and to processes for its purification. The invention includes within its scope these products in dilute forms, as crude concentrates, and also the pure crystalline form thereof. All of these novel products are useful in combatting microorganisms, especially various Gram-positive microorganisms. In addition, they are useful as disinfectants against such microorganisms and they are useful as an aid in the purification of mixed cultures for medical diagnostic and biological research purposes.

$H_2S$ Production (8 days, lead acetate strip test): strong production from cysteine HCl, production from peptone, proteose-peptone, tryptone, $Na_2S_2O_3$, peptone iron agar slants, peptone iron agar plus yeast extract (no soluble pigment in last two indicates no melanin produced).

Nitrate reduction: no reduction of nitrate to nitrite in 14 days in either dextrose nitrate broth or organic nitrate broth.

Tryptone yeast extract broth; no melanin in three days.

Skimmed milk: after 7 days coagulation and peptonization started, very pale pink soluble pigment; in 14 days good coagulation, peptonization one-third complete, pale salmon soluble pigment and pH changed from 6.4 to 6.7.

Growth at 50° C.: no growth.

Aerobiosis: growth only at surface of seeded tube of agar.
Carbon utilization: good utilization—arabinose, galactose, glucose, glycerol, fructose, maltose, mannose, starch, sucrose, trehalose, xylose. Utilization not as good but definite-raffinose, sodium succinate. Utilization doubtful—inositol, lactose, rhamnose. Not utilized—cellulose, dulcitol, mannitol, sorbitol, sodium acetate.

DETAILED DESCRIPTION OF THE INVENTION

This invention includes within its scope processes for growing the microorganism *S. olivaceus* ATCC 21542. The cultivation of this microorganism preferably takes place in aqueous nutrient media at a temperature of from about 24–30° C., and under submerged, aerobic conditions with agitation. Nutrient media which are useful for such purposes include a carbohydrate, such as sugars, starch, glycerol, molasses; a source of organic nitrogen, such as casein, soy bean meal, meat meal, wheat gluten, cotton seed meal, enzymatic digest of casein. A source of growth substances, such as distiller's solubles, yeast extract, as well as mineral salts, such as sodium chloride, potassium chloride, potassium phosphate, magnesium sulfate, and trace minerals such as copper, zinc and iron, may also be utilized with advantageous results. If excessive foaming is encountered during fermentation, antifoam agents such as vegetable oils, may be added to the fermentation medium. The pH of the fermentation tends to remain rather constant, but if variations are encountered, a buffering agent such as calcium carbonate may also be added to the medium.

Inoculum for the preparation of antibiotic CP–21,635 may be obtained by employing growth from slants of the aforesaid microorganism on such media as Emerson's agar or beef lactose. The growth may be used to inoculate either shake flasks or inoculum tanks, or alternatively, the inoculum tanks may be seeded from the shake flasks. The growth of the microorganism usually reaches its maximum in about two or three days. However, variations, in the equipment used, aeration, rate of stirring, and so forth, may affect the speed with which the maximum activity is reached. In general, the fermentation is continued until substantial antimicrobial activity is imparted to the medium, a period of from about 24 hours to about 4 days being sufficient for most purposes. Aeration of the medium in tanks for submerged growth is preferably maintained at the rate of about ½ to 2 volumes of free air per volume of broth per minute. Agitation may be maintained by means of agitators generally familiar to those in the fermentation industry. Aseptic conditions must, of course, be maintained throughout the transfer of the microorganism and throughout its growth.

The process of antibiotic production is conveniently followed during fermentation by biological assay of the broth employing a sensitive strain of *Staphylococcus aureus*. Standard plate assay technique is employed in which the zone of inhibition surrounding a filter paper disc saturated with the broth is used as a measure of antibiotic potency. After the fermentation broth has reached a suitable antibiotic potency, the mycelium is filtered, ordinarily without pH adjustment. A diatomaceous aid such as Super-Cel greatly facilitates the filtration. Various types of equipment may be employed, for instance, filter presses, centrifuges, etc. The filtered broth may be used as such or it may be dried. Preferably, however, the product is further purified.

Thin layer and paper chromatography are useful tools for analyzing the composition of crude and purified materials which contain antibiotic CP–21,635. Table I illustrates some of the various chromatographic systems and the respective $R_f$ values of Antibiotic CP–21,635. Bioautographic detection of the antibiotic activity by means of agar plates seeded with *S. aureus* is a useful means of establishing the presence and homogeneity of Antibiotic CP–21,635. Additional reagents which are helpful in detecting the antibiotic on thin layers include sulfuric acid and Van Urk's reagent (0.125 g. of p-dimethylaminobenzaldehyde and 0.1 ml. of 5% ferric chloride in 100 ml. of 65% sulfuric acid). Ultraviolet light is still another means of establishing the homogeneity of Antibiotic CP–21,635 on thin layers and papergrams and is also a convenient method of following purification of the antibiotic on chromatographic columns.

TABLE I

| Chromatographic support | Solvent system* | $R_f$ value |
|---|---|---|
| Silica gel | A | 0.15 |
|  | B | 0.32 |
|  | C | 0.37 |
|  | D | 0.62 |
|  | E | 0.70 |
| Paper | F | 0.29 |
|  | G | 0.81 |
|  | H | 0.88 |
|  | I | 0.86 |
|  | J | 0.36 |

*A=ethyl acetate; B=chloroform:acetone (1:1); C=ethyl acetate:methanol (1:1); D=chloroform:methanol (9:1); E=butanol; F=5% aqueous NH₄Cl; G=methanol:1.5% aqueous NaCl (4:1), paper buffered with 0.95 M Na₂SO₄, 0.05 M NaHSO₄; H=water saturated methyl isobutyl ketone:piperidine (100:1); I=water saturated methyl isobutyl ketone: glacial acetic acid (100:1); J=benzene saturated with 25% methanol in water.

The antibiotic is recovered from fermentation broth by a number of different procedures including solvent extraction and column chromatography or combinations thereof. Various organic solvents are useful in extracting Antibiotic CP–21,635 from filtered broth. Chloroform is a particularly effective solvent. Solvent extraction is preferably carried out using a volume of solvent approximately equal to the volume of broth from which it is desired to recover the antibiotic. It is often convenient to use two extractions, each with the volume of solvent being about ½ the volume of the broth. Various equipment such as separatory funnels, stirred tanks, and mechanical extracting devices such as centrifugal separators are helpful during the extractions.

The preferred method of recovery of Antibiotic CP–21,635 is as follows. The filtered broth, without pH adjustment, is extracted twice with ⅓ to ½ volumes of chloroform. The chloroform extracts are combined, and the solvent removed under vacuum at a bath temperature of about 35–37° C., n-propanol added to remove residual water and the solution concentrated to a tarry mass. The tarry concentrate is taken up in methanol and repeatedly extracted with heptane which is discarded. The methanol phase is concentrated under vacuum to a tarry mass, which on triturating with diethyl ether, yields a solid. The ether insoluble solid is repeatedly washed with ether (until little or no color is removed) and air dried. The crude antibiotic containing material is chromatographed on Sephadex LH-20 (Pharmacia Fine Chemicals Inc., Piscataway, New Market, N.J.) using methanol as the developing solvent. Column fractions are assayed for antibiotic activity by the disc method using agar plates seeded with *S. aureus*. The active fractions are combined, evaporated under reduced pressure and further purified by chromatography on silica gel or neutral alumina, using chloroform-methanol (9:1), ethyl acetate or ethyl acetate-methanol (9:1) as the developing solvent system. Active fractions from the Sephadex filtration may also be purified by chromatography on cellulose using water saturated methyl isobutyl ketone as solvent. Upon evaporation of the active fractions in vacuo at room temperature, Antibiotic CP–21,635 separates from ethyl acetate as a crystalline solid.

Antibiotic CP–21,635, is primarily active against a variety of strains of *Staphylococcus aureus* which are resistant to other known antibiotics. Table II illustrates the antibiotic spectrum against these and other microorganisms. These tests were run by seeding nutrient broth containing various concentrations of the pure antibiotic with the particular organism specified. The "minimum inhibitory concentration" indicated in Table II is the minimum concentration of the antibiotic (in micrograms/milliliter) at which growth of the microorganism failed to occur. Since the highest concentration employed in this test was 200 mcg./ml. the "minimum inhibitory concentration" is not precisely stated where such concentration apparently exceeded 200 mcg./ml. The test was conducted under standardized conditions. Antibiotic CP–21,635 protects mice experimentally infected with various strains of *Staphylococcus aureus*. It is effective by both the oral and subcutaneous routes of administration and is non-toxic at therapeutically effective dose levels. Table III illustrates the in vivo activity of Antibiotic CP–21,635.

Table II

| *Staphylococcus aureus*: | MIC |
|---|---|
| Strains 5 (normal) | 12.5 |
| A/R 400 multi-resistant | 3.12 |
| A/R 376 multi-resistant | 25.0 |
| A/R K3 multi-resistant | 12.5 |
| A/R K4 multi-resistant | 12.5 |
| HI 14 Pen/res | 25.0 |
| HI 22 Pen/res | 25.0 |
| S 51 T/Oleand/res | 3.12 |
| 96 T/Oleand/res | 12.50 |
| 134 T/Oleand/res | 12.50 |
| Streptococcus: | |
| Pyogenes C203 | >200 |
| Pyogenes 8668 | >200 |
| Pyogenes R109 resist. | >200 |
| Faecalis A121 | >200 |
| *Diplococcus pneumoniae* I | >200 |
| Mycobacterium sp. 607 | >200 |
| *Escherichia coli* 266 | >200 |
| *Pseudomonas aeruginosa* 173 | >200 |
| *Pseudomonas pyocyanea* 10490 | >200 |
| *Aerobacter aerogenes* 2 | >200 |
| *Klebsiella pneumoniae* 132 | >200 |
| *Shigella sonnei* SH4 | >200 |
| *Salmonella choleraesuis* 242 | >200 |
| *Pasteurella multocida* PM | >200 |
| *Malleomyces mallei* 10399 | >200 |
| *Vibrio comma* | >200 |

TABLE III

| Infecting organism | Dose, mg./kg. | Percent protection Oral | Percent protection Subcutaneous |
|---|---|---|---|
| S. aureus 400 | 2,860 | | 100 |
| | 1,430 | | 80 |
| | 715 | 100 | 80 |
| | 352 | 60 | |
| | 176 | 20 | |
| S. aureus 5 | 522 | 60 | 80 |
| | 261 | 60 | 60 |

The following examples are given by way of illustration and are not to be construed as limitations of this invention many variations of which are possible within the scope and spirit thereof.

EXAMPLE I

A sterile aqueous medium having the following composition is prepared:

| Ingredient: | Grams/liter |
|---|---|
| Soybean meal | 10.0 |
| Cerelose | 10.0 |
| Corn starch | 10.0 |
| Distillers solubles | 5.0 |
| Sodium chloride | 5.0 |
| Calcium carbonate | 1.0 |

A slant culture of *Streptomyces olivaceus sensu* Hütter ATCC 21542 is transferred to 100 ml. of this medium in a 300 ml. Erlenmyer flask and shaken 69–72 hours until good growth is obtained.

Fermentors containing the above described sterile medium are seeded with 5% v./v. of the grown inoculum. The temperature is maintained at 27–28° C. and the broth is stirred at 1700 r.p.m. and aerated at the rate of 1 volume of air per volume of broth per minute. After 69–72 hours the broth is filtered with the aid of Super-cel, and extracted twice with half volumes of chloroform. The chloroform extracts are combined, the solvent removed under vacuum and the tarry mass taken up in methanol. The methanol solution is extracted six times with heptane. The methanol phase is concentrated under vacuum to a tar. This material on triturating with diethyl ether yields a solid which is repeatedly washed with ether and air dried.

The crude antibiotic is purified by gel-filtration chromatography employing Sephadex LH–20 (Pharmacia Fine Chemicals Inc., Piscataway, New Market, N.J.) with methanol as the developing solvent. The active fractions are combined, concentrated under reduced pressure and chromatographed on neutral alumina using ethyl acetate as developing solvent. Upon concentration of the active fractions at room temperature, Antibiotic CP–21,635 separates from the ethyl acetate as a crystalline solid.

Antibiotic CP–21,635 is a neutral crystalline solid which melts in the range of 244–254° C. with decomposition, and on analysis gives the following average proportions:

| Carbon | 55.17 |
|---|---|
| Hydrogen | 5.84 |
| Nitrogen | 15.99 |
| Sulfur | 4.02 |
| Oxygen (by difference) | 18.98 |

In the mass spectrometer, Antibiotic CP–21,635 exhibits a molecular ion peak at 779 mass units. These data calculate to the molecular formula of $C_{36}H_{45}N_9SO_9$.

Antibiotic CP–21,635 is optically active, having a rotation of $[\alpha]_{589}^{28} = +88.2°$ (c. 1.17% in methanol). Its ultraviolet absorption maxima in methanol solution occur at 222, 283 and 291 m$\mu$ with extinction coefficients of 49,000, 5,100 and 4,300 respectively.

The infrared spectrum of Antibiotic CP–21,635 is attached. A chloroform solution shows characteristic absorption in the infrared region at the following wavelengths in microns: 2.95, 3.03, 3.43, 5.78, 5.87, 6.00, 6.07, 6.17, 6.50, 6.55, 6.63, 6.70, 6.80, 7.10, 7.35, 7.50, 7.70, 7.80, 8.85, 9.03, 9.15, 9.45, 9.67, 9.95, 10.30, 10.70 and 10.85. Antibiotic CP–21,635 gives positive reactions with 2,4-dinitrophenylhydrazine and Van Urk's reagent but does not react with ninhydrin.

What is claimed is:

1. Antibiotic substance CP–21,635 having the empirical formula $C_{36}H_{45}N_9SO_9$ which in crystalline form has a melting point of 244–254° C. with decomposition and an optical rotation of $[\alpha]_{589}^{28} = +88.2°$ at a concentration of 1.17% in methanol, absorption maxima in the ultraviolet light region of the spectrum at 222, 283 and 291 m$\mu$ with extinction coefficients of 49,000, 5,100 and 4,300 respectively, and having the average composition by weight of 55.17% carbon, 5.84% hydrogen, 15.99% nitrogen, 4.02% sulfur and 18.98% oxygen (by difference) and when dissolved in chloroform exhibits characteristic absorption in the infrared region at the following wavelengths in microns: 2.95, 3.03, 3.43, 5.78, 5.87, 6.00, 6.07, 6.17, 6.50, 6.55, 6.63, 6.70, 6.80, 7.10, 7.35, 7.50, 7.70, 7.80, 8.85, 9.03, 9.15, 9.45, 9.67, 9.95, 10.30, 10.70, and 10.85.

2. A process for producing the antibiotic substance CP-21,635 which comprises cultivating the microorganism *Streptomyces olivaceus sensu* Hütter ATCC 21,542 in an aqueous nutrient medium containing a source of carbohydrate, a source of organic nitrogen and inorganic salts under submerged aerobic conditions until substantial antimicrobial activity is imparted to said medium.

3. A process as in claim 2 wherein the antibiotic substance is recovered from the fermentation broth.

References Cited

Miller, Pfizer Handbook of Microbial Metabolites, McGraw-Hill Book Co., Inc., N.Y., 1961, pp. 266 and 358.

JEROME D. GOLDBERG, Primary Examiner

U.S. Cl. X.R.

195—80